United States Patent [19]
Neiger

[11] Patent Number: 5,266,807
[45] Date of Patent: Nov. 30, 1993

[54] PASSIVE INFRARED DETECTION SYSTEM
[75] Inventor: Benjamin B. Neiger, Floral Park, N.Y.
[73] Assignee: Leviton Manufacturing Co., Inc., Little Neck, N.Y.
[21] Appl. No.: 916,168
[22] Filed: Oct. 10, 1986
[51] Int. Cl.⁵ .................. G01J 1/00; G08B 13/18; G08B 17/12
[52] U.S. Cl. .................. 250/353; 250/342; 340/555; 340/556; 340/557; 340/573; 340/600; 361/173; 361/175
[58] Field of Search .................. 361/173, 175; 340/555-557, 573, 600; 250/342, 353

[56] References Cited
U.S. PATENT DOCUMENTS

| | | | |
|---|---|---|---|
| 3,551,676 | 12/1970 | Runnels | 250/353 |
| 4,268,752 | 5/1981 | Herwig et al. | 250/353 |
| 4,346,427 | 8/1982 | Blissett et al. | 361/173 |
| 4,514,630 | 4/1985 | Takahashi | 250/353 |

Primary Examiner—Stephen C. Buczinski
Attorney, Agent, or Firm—Paul J. Sutton

[57] ABSTRACT

The present invention teaches an improved passive infrared detection system for use in controlling electrical wiring devices and systems in residential, commercial and industrial environments. Interior or exterior lighting, by way of example only, and the power or current feeding same, is controlled such that the presence of a body entering a predetermined zone, such as a room, will be detected in an improved manner and will trigger a series of events resulting in the switching of the lights on or off, as desired. The detecting portion of the combination comprising the present invention is capable of receiving presence signals 360 degrees about a reference line, thereby greatly increasing the ability of the system of this invention to detect body presence within any interior area, for example. This qualifies the present system to function as an improved security system.

4 Claims, 3 Drawing Sheets

PASSIVE INFRARED DETECTION SYSTEM

The present invention relates to the field of infrared radiation as a controlling medium, and more particularly to an improved passive infrared detection and control or switching system.

Infrared systems of various types are known. Examples of issued patents in this area include U.S. Pat. No. 4,346,427, which is improved by the present invention, and U.S. Pat. Nos. 3,439,358; 3,924,130; 3,958,118; 4,029,176; 4,031,408; and 4,196,425, all of which have been cited within aforesaid U.S. Pat. No. 4,346,427 by the U.S. Patent and Trademark Office. Other prior art includes control devices responsive to heat emanating from a human body to provide security-type systems, such as one available from RCA Corporation.

However, a need exists for a system which is capable of better detecting the presence of a body within a predefined area, such as a room within a building. One of the problems with the present state of the art to which the present invention pertains resides with the limited field or angle within which a body may be detected. This limitation is inherent from the structure of the detecting means, which only permits infrared signals from a body to enter the detector within an angle of 180 degrees, for example. Thus, with a prior art detector, more than one such detector is required to provide the detecting coverage enabled by the present invention, thereby increasing the cost and possibly affecting the appearance of the room.

It is an object of the present invention to provide a passive infrared detection system capable of detecting the presence of a body within a range of over 180 degrees about a detector.

It is another object of the present invention to provide such a system, capable of detecting the presence of a body 360 degrees about a detector.

It is a further object of the present invention to provide such a system, wherein the detecting portion includes an annular curved outer reflecting surface extending about a relatively central reflecting axis and is capable of reflecting infrared signals emanating from a body and within parallel paths to a detection signal window lying within a plane at an angle with respect to a central reflecting axis.

It is yet another object of this invention to provide such a system, wherein a detector includes a reflecting surface of revolution.

It is another object of the present invention to provide such a system which is relatively easy to install within an existing room and which operates relatively efficiently.

It is a further object of the invention to provide such a system which is relatively easy to manufacture at a relatively reasonable cost and which is extremely sensitive to the presence of a body.

According to a preferred embodiment of the present invention, and by way of example only, a system for detecting the presence of a body is provided which is capable of installation within a newly constructed or existing room or envelope, wherein a detecting portion of the system includes a reflecting surface capable of reflecting infrared signals received from a body to and through a detection window and to a sensor. This surface is a concave arcuate surface of revolution about a reflecting axis which is able to "capture" signals. The "captured" signals are amplified and converted to a plurality of reset signals. The reset signals have characteristics which, when "disturbed" over a predetermined period of time, enable a control circuit to produce a control signal which, in turn, will switch on a current within a line, thereby causing the lighting of an area (the room) or performing any other desired function in response to the switched on current within the line.

In a preferred embodiment of the invention, a change in the characteristics of the reset signals results from movement of the body within the room or envelope within which the system is situated, and upon a timing circuit failing after a predetermined time period to receive a reference signal characteristic due to such body movement, it cause the control signal to be produced.

The reader will appreciate after a reading of the present specification and said U.S. Pat. No. 4,346,427 that while certain elements of the prior art are combined with the novel detection portion of the present invention, the present system produces a new and novel combination of elements not known to exist heretofore.

A detector housing supports a thermopile in the reflected signal path for receiving the signal through a window, and is adapted to be supported from the center of the ceiling of a room, or the like. The infrared signals emanating from a body are amplified in a plurality of amplifier stages having appropriate filters known to the art for filtering out lower than desired frequency signals. A preamplifier stage is optional, and serves to reduce adverse temperature effects.

Amplified signals are encoded and, after entering the time delay circuitry, enter a control unit for producing a control signal for influencing a current line.

Other objects and features of the present invention will become apparent from a reading of the following specification, drawings and claims, read in conjunction with one another, and wherein:

Figure 1:
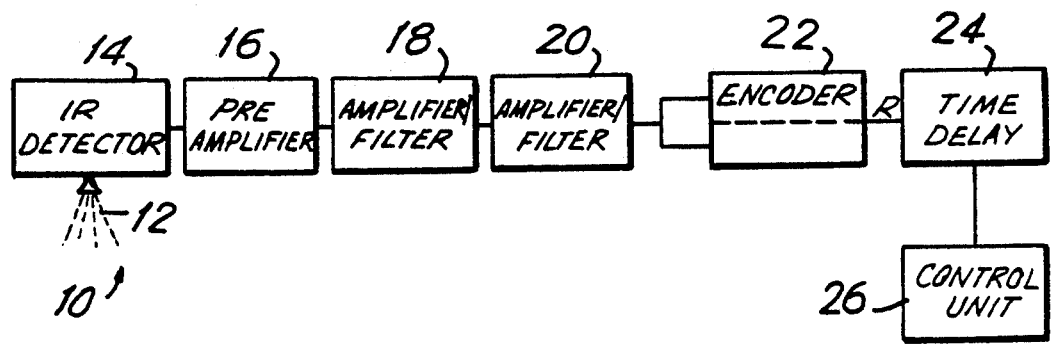
FIG. 1 is a block diagram illustrating a passive infrared detection system according to the present invention.
Figure 4:
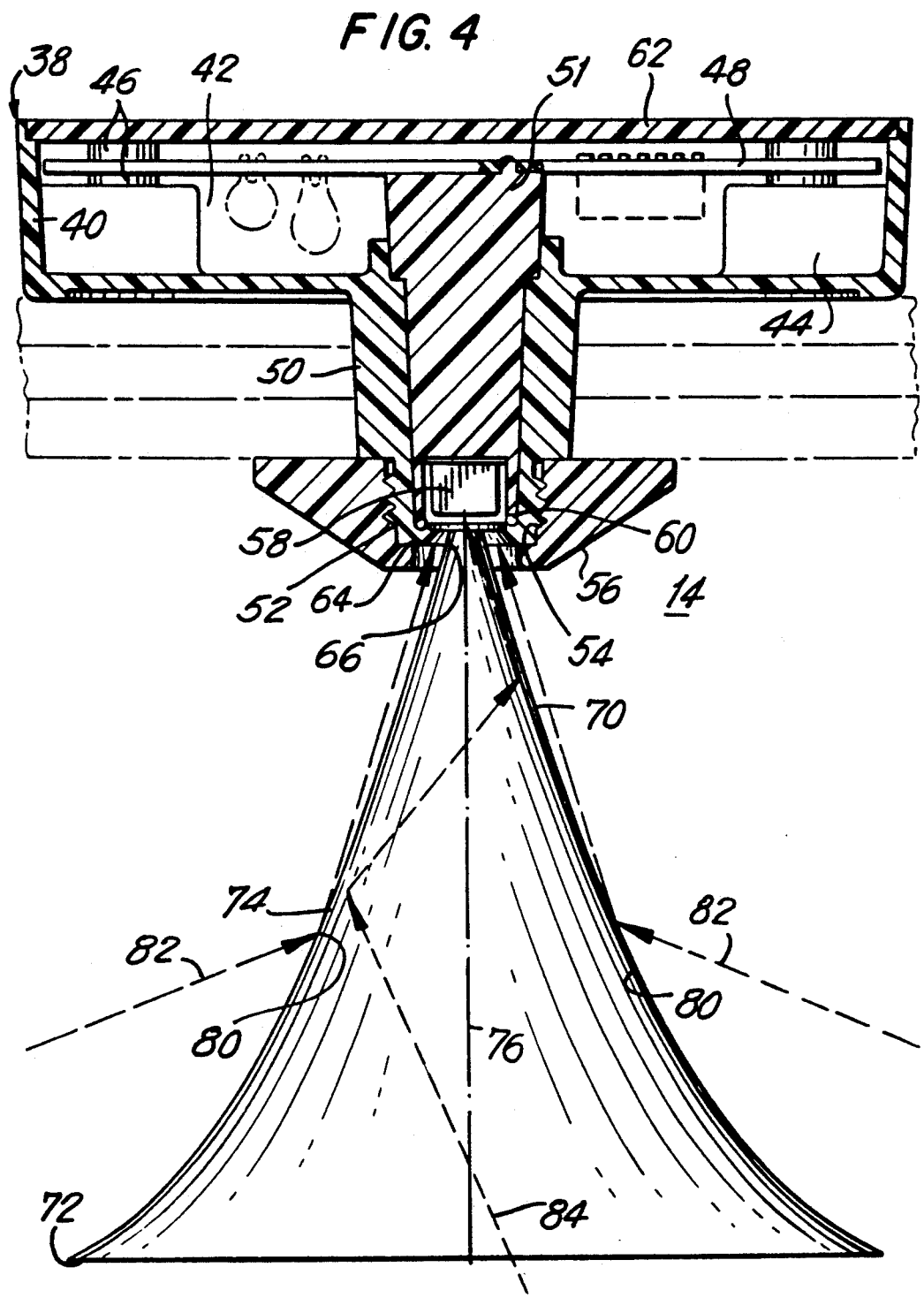
FIG. 4 is a sectional elevational view of a detector subassembly according to the present invention.

Referring now to FIG. 1, in system 10 according to the present invention, infrared signals (shown schematically by phantom lines 12) are received by an infrared detector subassembly 14, also seen in FIG. 4. These signals received by the detector 14 are amplified within pre-amplifier 16 and then successfully amplified and filtered within amplifier/filters 18 and 20 to eliminate lower-than-desired frequencies before being encoded within encoder 22. With the aid of a time delay or timing circuit 24, characteristics of reset signals produced by the encoder 22 are monitored and, upon movement of the body emanating infrared signals, a control signal is produced by a control unit 26 and is sent to a circuit breaker or air gap switch (not shown) which may either break or make the electrical connection within a current-carrying line.

Figure 2:
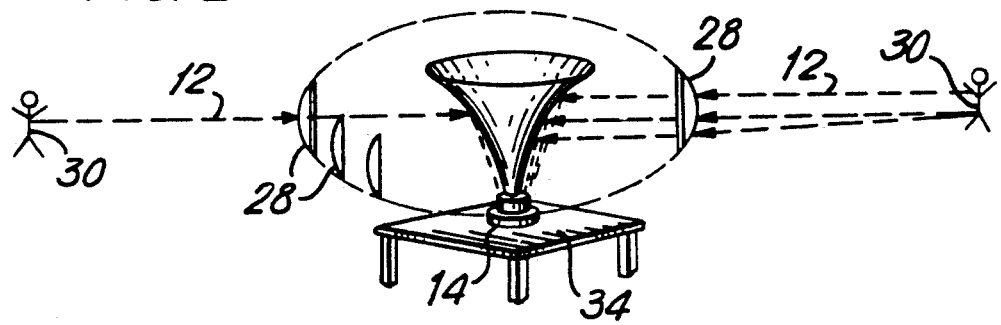
FIG. 2 is a perspective-type illustration of a table-mounted detector according to the present invention.
Figure 3:
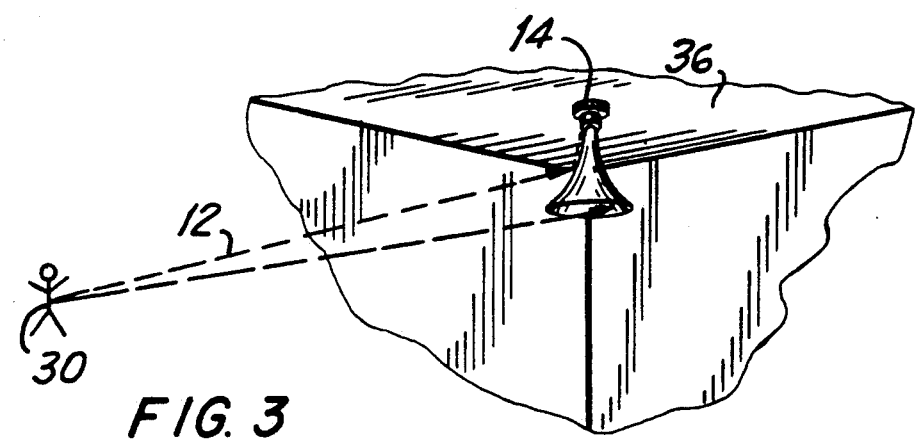
FIG. 3 is a fragmentary perspective-type illustration of a ceiling-mounted detector according to the present invention.

FIG. 2 illustrates in an embodiment of the invention the use of optional lenses 28 which influence infrared signals emanating from bodies 30. Lenses 28 serve a focusing function, directing signals 12 in substantially parallel directions substantially 90 degrees with respect to an axis 32 referred to in more detail below. In FIG. 2, detector subassembly 14 is illustrated in an enlarged view supported upon a piece of room furniture, such as a table 34 which may be substantially centrally located within the room or located at any one of a variety of locations. FIG. 3 illustrates detector subassembly 14 supported from the ceiling 36 of a room in the line of sight of bodies entering the room.

FIG. 4 in a sectional elevational view illustrates detector subassembly 14. The reader's attention is again directed to the similarity of only a portion of subassembly 14 with that shown in U.S. Pat. No. 4,346,427. However, the significant differences in capability enjoyed by the present invention will be apparent. More specifically, the field of view of the device shown in U.S. Pat. No. 4,346,427 is limited by the geometry of its opening to between 90 and 120 degrees, as states in its specification at columns 6 and 7. With the present invention, the user enjoys both a 360 degree field of view as well as a field of view in front of the detector, as will become apparent.

A housing 38 of detector subassembly 14 formed of plastic includes a base portion 40 formed with a substantially central recess area 42 surrounded by a peripheral seat portion 44 which carries a number of spacers 46 designed to hold in desired position elements of the subassembly, including a circuit board 48. A relatively depending neck portion 50 surrounds central locator 51 and is formed with external threads 52, which matingly receive internal threads 54 formed within retainer 56. Retainer 56 is further formed with a central opening in communication with an hermitically sealed sensor 58, including for example a small multijunction thermopile (not seen), of the type available from Dexter Research Center of Dexter, Mich. An O-ring 60 serves to keep sensor 58 centrally located within neck 50. A back plate 62 seals the housing base 40 at its top or back.

At the lower or front end 64 of neck portion 50 a window 66 is formed through retainer 56 through which the smaller upper end 68 of a funnel-shaped reflector 70 extends and is held in the position shown in FIG. 4. Larger lower end 72 of reflector 70 depends from housing 38 such that its curved concave surface of revolution 74 extends about relatively central reflector axis 76. In an optional preferred embodiment of the present invention reflector 70 is further formed with a central opening 78 defined by inner reflecting surfaces 80.

In operation, outer surfaces of revolution 74 reflect toward window 66 infrared signals emanating from a body, either with the aid of or without lenses 28. Phantom direction lines and arrows 82 illustrate paths of such infrared signals which impact outer surface 74, while phantom direction lines and arrows 84 illustrate the path of signals which impact inner reflecting surfaces 80. Thus, the field of view of detector subassembly 14 is remarkably large, enabling a far more sensitive detector without sacrificing the ability to filter out undesired signals that might cause false tripping. Whether detector subassembly 14 is mounted in a ceiling 36 or a wall is a matter of choice for the user.

Figure 5A:
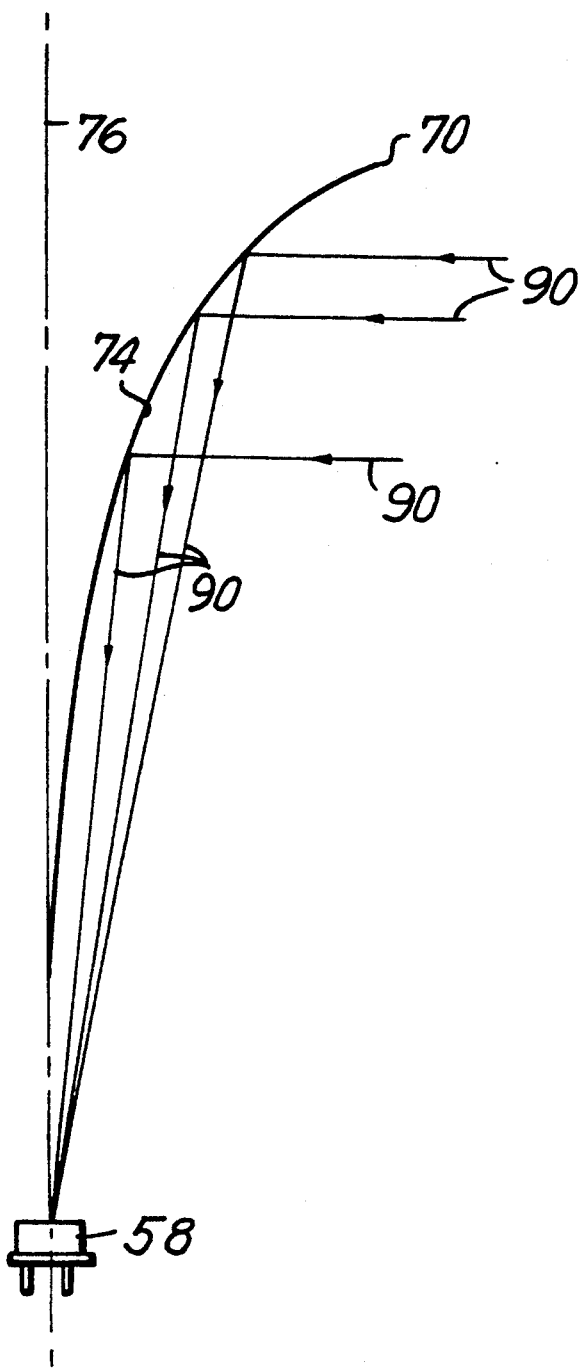
FIG. 5 is a schematic representation illustrating paths of infrared signals being reflected with the present invention.
Figure 5B:
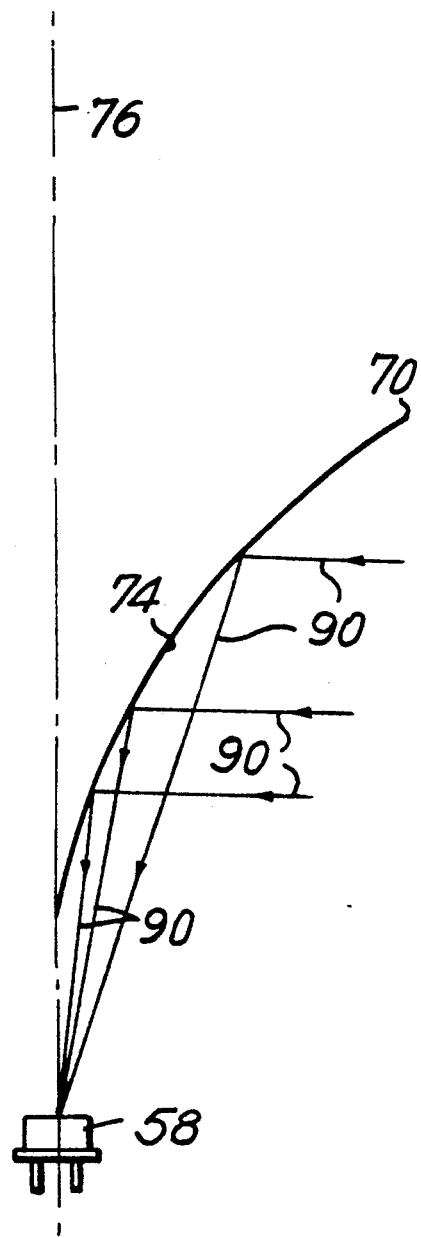

FIG. 5 is presented to illustrate the variety of angles of incidence of infrared signals which may impact surface 74 in substantially parallel and horizontal paths 90 and which are each reflected to sensor 58 with the aid of surfaces of revolution 70. The outer reflective surfaces 74 shown in 5A and 5B for example, are tailored in shape to reflect the infrared signals to their respective sensor 58. In one preferred embodiment of the present invention, surface reflect is substantially the locus of points along a parabola.

It is to be understood that the embodiments of the present invention presented and illustrated herein are examples only of the invention, and not by way of limitation, and the scope and spirit of the present invention may be further understood from a reading of the appended claims.

What is claimed is:

1. A system for detecting the presence of a body within a predetermined envelope, comprising, in combination:

signal reception means for producing a detection signal in response to detecting an infrared signal from a body, simplifying means for receiving and amplifying said detection signal, said amplifying means comprising an electrical circuit capable of producing a plurality of reset signals, timing means for receiving said reset signals and producing a control signal in response to characteristics of said reset signals, and control means responsive to said control signal for switching current within a line, said signal reception means including;

an electrical sensor, responsive to infrared, for receiving said infrared signal, an axis extending from said sensor, an infrared reflector, having an annular curved outer reflecting surface of revolution extending about said axis, extending along the axis and having an upper end and a lower end, said upper end having a reduced average radius and being closer to the sensor than the lower and, said curve of said outer reflecting surface curve being for receiving signals directly from said body for reflecting said signals directly to said sensor by means of said annular curved outer reflecting surface, said annular curved inner reflecting surface extending about said axis, along the axis and having an upper end and a lower end, said upper end having a reduced average radius and being closer to the sensor than the lower end, defining a central detecting opening extending substantially coaxially with respect to said reflecting axis, said curve of said inner reflecting surface curve being for receiving signals directly from said body for reflecting said signals directly to said sensor by means of said annular curved inner reflecting surface.

2. A system according to claim 1, further comprising:
a lens, positioned between the body and said reflecting surface for focusing said infrared signal before said signal reaches said reflecting surface.

3. A system according to claim 1, further comprising:
a lens, positioned between the body and said outer reflecting surface for focusing said infrared signal before said signal reaches said outer reflecting surface.

4. A system according to claim 1, further comprising:
said central detecting opening further being for receiving signals directly from said body for direct transmission to said sensor without intermediate transmission through a lens.

* * * * *